(12) United States Patent
Cheng (10) Patent No.: US 10,605,380 B1
(45) Date of Patent: Mar. 31, 2020

(54) CLAMPING RING AND SHELL STRUCTURE HAVING THE SAME

(71) Applicant: Chicony Power Technology Co., Ltd., New Taipei (TW)

(72) Inventor: Chao-Cheng Cheng, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/170,051

(22) Filed: Oct. 25, 2018

(30) Foreign Application Priority Data

Sep. 14, 2018 (TW) .............................. 107132486 A (51) Int. Cl.
| | | |
|---|---|---|
| *F16M 11/00* | (2006.01) | |
| *F16L 3/13* | (2006.01) | |
| *H02G 3/08* | (2006.01) | |
| *F16L 3/12* | (2006.01) | |
| *F16B 2/24* | (2006.01) | |
| *H02G 3/04* | (2006.01) | |
| *H01B 7/00* | (2006.01) | |

(52) U.S. Cl.
CPC .............. *F16L 3/13* (2013.01); *F16L 3/1222* (2013.01); *H02G 3/088* (2013.01); *F16B 2/241* (2013.01); *H01B 7/0045* (2013.01); *H02G 3/045* (2013.01)

(58) Field of Classification Search
CPC ......... F16L 3/08; F16L 37/086; F16L 37/088; H02G 3/0616
See application file for complete search history.

(56) References Cited

U.S. PATENT DOCUMENTS

| | | | | |
|---|---|---|---|---|
| 1,513,710 A | * | 10/1924 | Lewis ................ | A44B 17/0011 24/676 |
| 6,955,512 B2 | * | 10/2005 | Allen .................... | F16B 21/186 211/26 |

(Continued)

FOREIGN PATENT DOCUMENTS

| | | |
|---|---|---|
| CN | 1093327 | 10/2002 |
| CN | 203537698 | 4/2014 |

(Continued)

OTHER PUBLICATIONS

"Office Action of Taiwan Counterpart Application", dated Jun. 5, 2019, pp. 1-3.

*Primary Examiner* — Amy J. Sterling
(74) *Attorney, Agent, or Firm* — JCIPRNET (57) ABSTRACT

A clamping ring including a connecting beam and two engaging members is provided. The two engaging members are respectively disposed at two ends of the connecting beam, and the connecting beam and the two engaging members are adapted to accommodate and clamp a wire. At least one of the two engaging members has a curved portion, a column foot, and a hook. The curved portion has an obliquely extended neck block. The neck block is coupled to the corresponding end of the connecting beam, such that the curved portion has a vertical distance with respect to the connecting beam. A hollow groove is formed inside the curved portion. The column foot is coupled to a bottom of the curved portion opposite to the neck block, and an angle is formed between the column foot and the connecting beam. The hook is coupled to the column foot, and a deforming groove is formed between the column foot and the hook.

8 Claims, 9 Drawing Sheets

(56) References Cited

U.S. PATENT DOCUMENTS

| | | | |
|---|---|---|---|
| 7,267,572 B2* | 9/2007 | Nad | H01R 13/5808 |
| | | | 439/449 |
| 8,791,377 B2* | 7/2014 | Jafari | H02G 3/0691 |
| | | | 174/660 |
| 9,353,890 B2 | 5/2016 | Dickinson et al. | |
| 9,601,908 B2 | 3/2017 | Merritt et al. | |
| 2006/0159399 A1 | 7/2006 | Erdman et al. | |
| 2011/0290949 A1 | 12/2011 | Trouve et al. | |
| 2017/0336577 A1 | 11/2017 | Kaplan | |

FOREIGN PATENT DOCUMENTS

| | | |
|---|---|---|
| CN | 204760647 | 11/2015 |
| CN | 205070090 | 3/2016 |
| CN | 205790670 | 12/2016 |
| CN | 206524457 | 9/2017 |
| CN | 206585419 | 10/2017 |
| CN | 206992384 | 2/2018 |
| CN | 207283105 | 4/2018 |
| TW | I577102 | 4/2017 |
| TW | M556914 | 3/2018 |

\* cited by examiner

CLAMPING RING AND SHELL STRUCTURE HAVING THE SAME

CROSS REFERENCE TO RELATED APPLICATION

This application claims the priority benefit of Taiwan application serial no. 107132486, filed on Sep. 14, 2018. The entirety of the above-mentioned patent application is hereby incorporated by reference herein and made a part of specification.

BACKGROUND OF THE INVENTION

Field of the Invention

The present invention relates to a clamping ring and a shell structure having the same, and more particularly, to a clamping ring holding a wire to prevent it from coming loose.

Description of Related Art

The existing electronic connector with waterproof function undergoes a waterproof treatment mainly in the structure of two regions, one is a region of the shell connected to a gap, and the other is a joint of a wire and a wire hole of the shell.

The wire is bonded to the wire hole in the following manner. The wire is correspondingly inserted into the wire hole of the shell, and an external force is applied to push the wire inward, such that the wire and the inner wall surface of the wire hole are pushed against each other to be tightly adhered, thereby achieving a sealing waterproof effect. However, the wire is mostly made of elastic or soft materials. After long-term use, the tightness of the wire to the wire hole may be reduced due to elastic fatigue or artificial pull, and even separation of the wire from the shell may occur. To alleviate this situation, a clamping ring is currently used to clamp a side in which the wire passes into the shell, such that the clamping ring holds and restricts the position of the wire to increase the tightness of the wire to the wire hole and prevent the wire and the wire hole from coming loose.

The rigidity of the joint between the clamping portions at two sides and the top of the existing clamping ring is too high, and the joint is prone to deformation and fracture during the assembly process. The clamping portions at two sides of the existing clamping ring are disposed in parallel in a straight line. When the wire is clamped, the two clamping portions are also pushed outward by the wire instead of clamping the wire flat. In this case, the clamping portions at two sides always clamp the wire in a pushed state, such that the stress of deformation is concentrated at the aforementioned joint, thus causing the service life of the clamping ring to be reduced such that deformation and fracture occur prematurely.

Therefore, the development of a clamping ring that can reduce deformation to improve the service life has become an important development goal.

SUMMARY OF THE INVENTION

The present invention provides a clamping ring and a shell structure having the same that can alleviate the fracture damage of the clamping ring during the assembly process and the shortened service life after the assembly process, thereby improving the yield and service life of the finished product and avoiding the shell structure and the wire from coming loose.

A shell structure of the present invention includes a substrate, a side board, a connecting portion, a wire, and a clamping ring. The side board is disposed at an edge of the substance. The side board is extended upward along the edge of the substrate and has an inner surface. The connecting portion is disposed on the side board, and the connecting portion includes: a first hole disposed at the outer surface of the side board; a continuous wall extended toward the inner surface along the edge of the first hole to form an accommodation space; a retaining wall disposed at one end of the continuous wall adjacent to the inner surface; a second hole disposed at the retaining wall and disposed corresponding to the first hole, and the first hole is larger than the second hole. The wire passes through the accommodation space, wherein a portion of the wire is engaged with the retaining wall. The clamping ring holds an end of the wire adjacent to the second hole, the clamping ring is located outside the accommodation space, and the outer diameter of the clamping ring is greater than the aperture of the second hole. The clamping ring includes a connecting beam and two engaging members. The two engaging members are respectively disposed at two ends of the connecting beam, and the connecting beam and the two engaging members are adapted to accommodate and position the wire.

A clamping ring of the present invention includes a connecting beam and two engaging members. The two engaging members are respectively disposed at two ends of the connecting beam, and the connecting beam and the two engaging members are adapted to accommodate and position a wire. At least one of the two engaging members has a curved portion, a column foot, and a hook. The curved portion has an obliquely extended neck block. The neck block is coupled to the corresponding end of the connecting beam, such that the curved portion has a vertical distance with respect to the connecting beam. The inside of the hollow groove forms the curved portion. The column foot is coupled to the bottom of the curved portion opposite to the neck block, and an angle is formed between the column foot and the connecting beam. The hook is coupled to the column foot, and a deforming groove is formed between the column foot and the hook.

Based on the above, the clamping ring of the present invention is adapted to be disposed in a shell structure of an electronic adapter and to accommodate and position a wire passing through the shell structure. The curved portion on at least one of the engaging members of the clamping ring forms a hollow groove. During the assembly process of the clamping ring, the clamping ring is deformed by the extrusion of the wire, and the curved portion can increase the amount of elastic deformation via the hollow groove, reducing the stress acting on the curved portion, and alleviating the fracture of the curved portion due to excessive force to improve the yield of the assembled product. When the clamping ring is assembled, the clamping ring accommodates and clamps the wire, and the hollow groove of the curved portion can also reduce the build-up of the clamping stress to increase the service life of the clamping ring.

More specifically, a deforming groove is formed between the column foot and the hook, and during the assembly process of the clamping ring and the wire, the deforming groove causes the hook to be elastically deformed toward the column foot, which also reduces the stress acting on the engaging members and alleviates fracture damage, etc. In addition, via the dispositions of the hollow groove and the deforming groove, the material needed to make the clamping ring can be reduced.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1A:
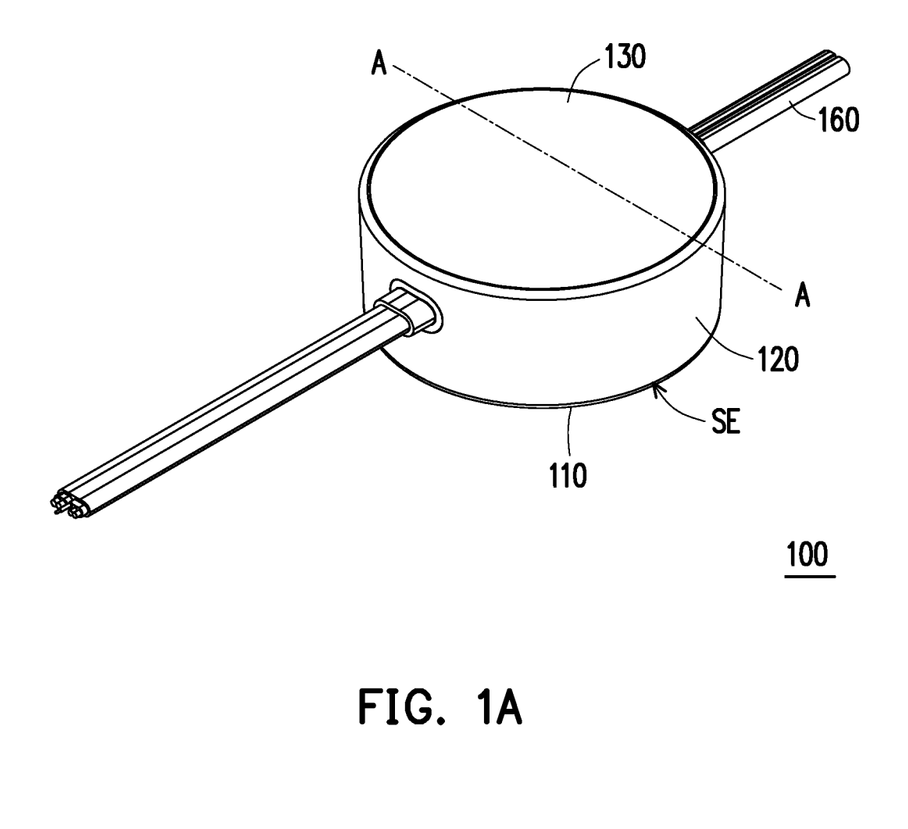
FIG. 1A is a perspective view of a shell structure according to an embodiment of the present invention.
Figure 1B:
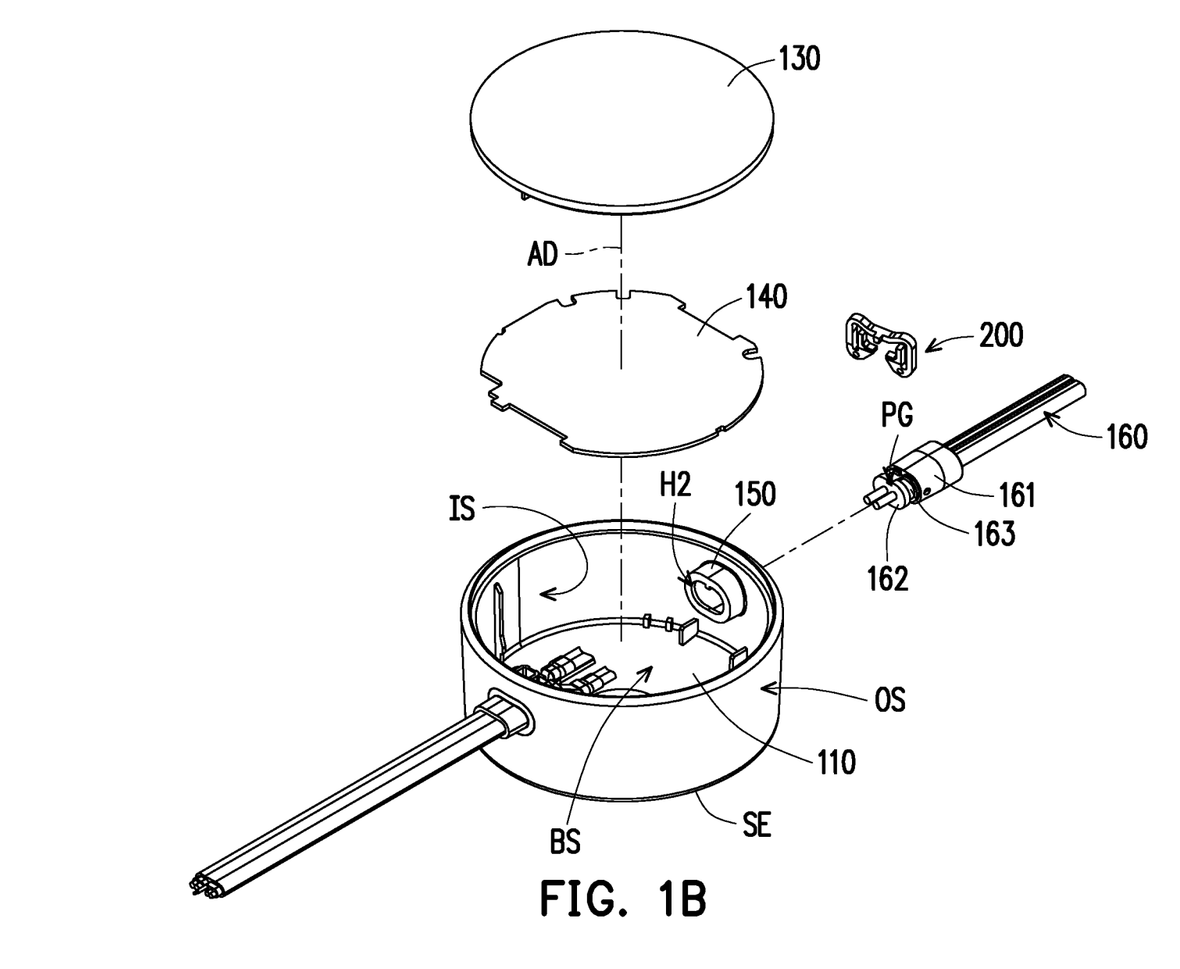
FIG. 1B is an exploded view of the shell structure of FIG. 1A.

FIG. 1A is a perspective view of a shell structure according to an embodiment of the present invention. FIG. 1B is an exploded view of the shell structure of FIG. 1A.

Referring to FIG. 1A and FIG. 1B, a shell structure 100 of the present invention is adapted to carry a circuit element and is for example applied to a consumer electronic, electronic equipment, or power conversion adapter. The power conversion adapter is adapted to convert an external power source into a voltage and current value of a required specification after being transformed and rectified to be supplied to an electronic product and electronic equipment.

Figure 1C:
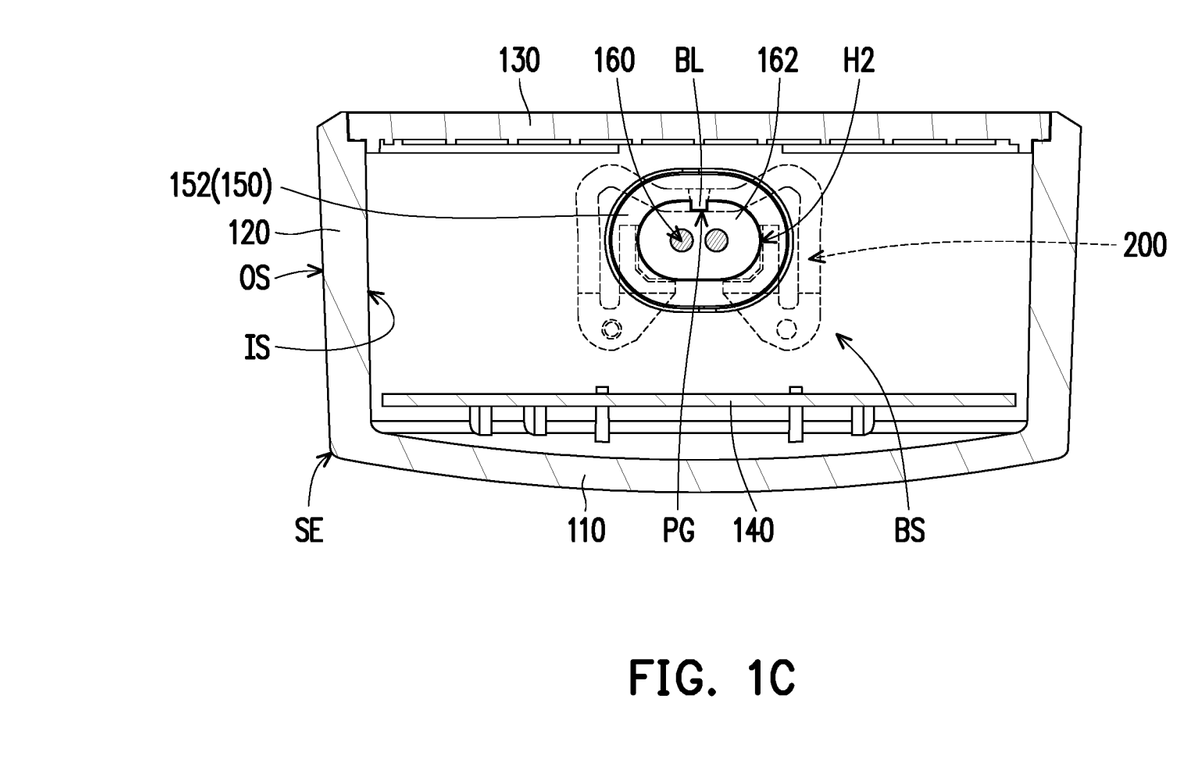
FIG. 1C is a cross section of the shell structure and clamping ring of FIG. 1A along section line A-A.
Figure 1D:
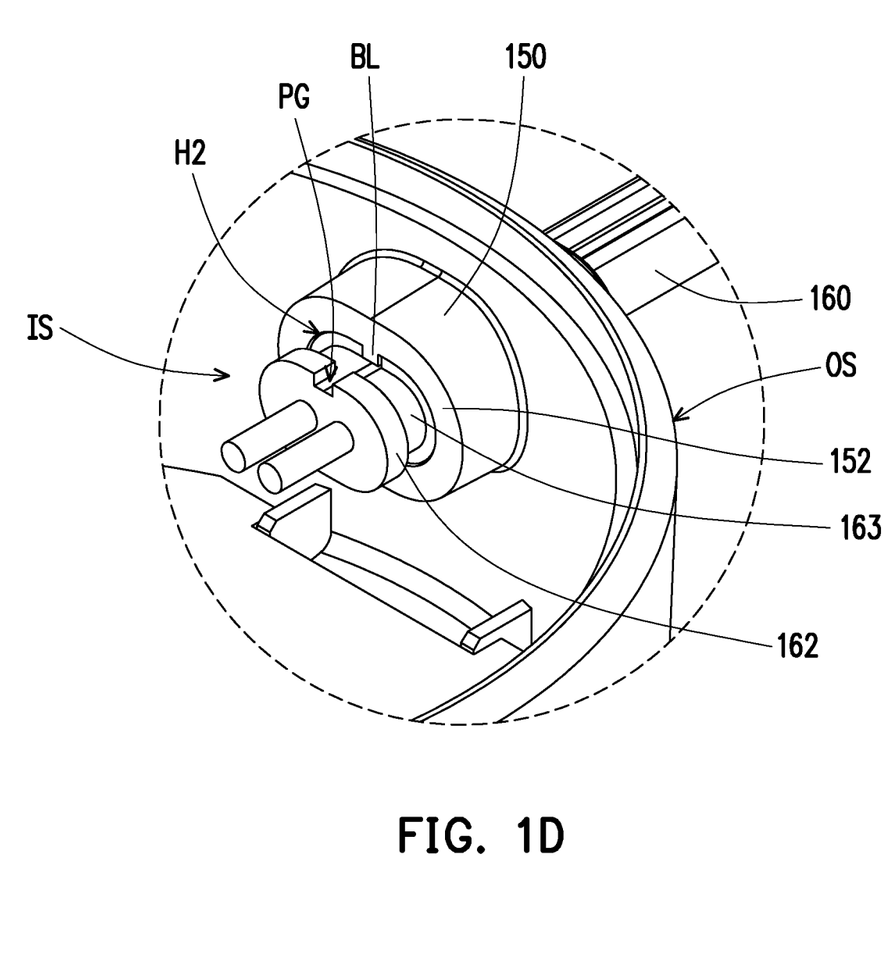
FIG. 1D is an enlarged view of the wire of FIG. 1B through a bearing space.
Figure 1E:
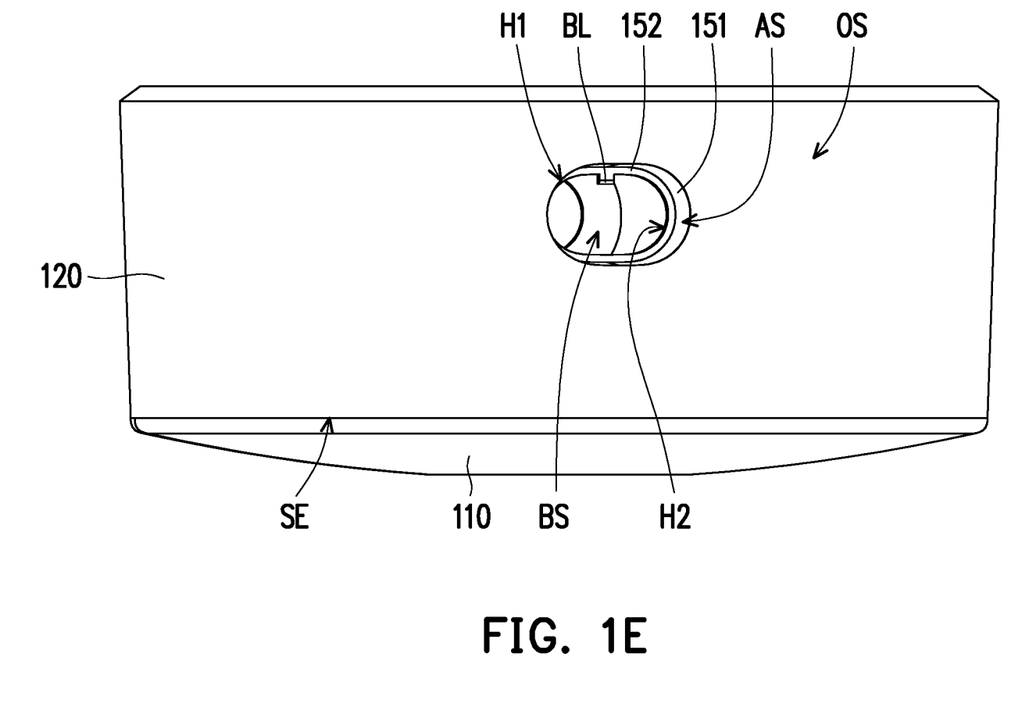
FIG. 1E is an enlarged view of a connecting portion of the shell structure of FIG. 1B.

FIG. 1C is a cross section of the shell structure and clamping ring of FIG. 1A along section line A-A. FIG. 1D is an enlarged view of the wire of FIG. 1B through a shell structure. FIG. 1E is an enlarged view of a connecting portion of the shell structure of FIG. 1B.

The shell structure 100 of the present invention includes a substrate 110, a side board 120, an upper cover 130, a circuit element 140, a connecting portion 150, a wire 160, and a clamping ring 200.

The substrate 110 is, for example, a plastic material that is injection molded, and has a curved appearance. The side board 120 is formed by, for example, a molding method similar to the substrate 110, and is disposed around an edge SE of the substrate 110, and the side board 120 is extended upward (an axis direction AD) along the edge SE of the substrate 110 and has an inner surface IS. In addition, the substrate 110 and the side board together form a bearing space BS. The upper cover 130 is correspondingly disposed in the side board 120 and abutted against the inner surface IS for sealing the bearing space BS. The circuit element 140 is disposed in the bearing space BS and is fixed on the substrate 110.

Referring to FIG. 1C to FIG. 1E, the connecting portion 150 is disposed on the side board 120, wherein the connecting portion 150 includes a first hole H1, a continuous wall 151, a retaining wall 152, and a second hole H2.

The first hole H1 is disposed at an outer surface OS of the side board 120. The continuous wall 151 is extended toward the direction of the inner surface IS along the edge of the first hole H1 and protruded from the inner surface IS of the side board 120 to form an accommodation space AS. The retaining wall 152 is disposed at one end of the continuous wall 151 adjacent to the inner surface IS. In detail, the retaining wall 152 is vertically extended in the continuous wall 151 and has an inner diameter smaller than the inner diameter of the first hole H1. The second hole H2 is disposed at the retaining wall 152 and linked to the accommodation space AS and the bearing space BS of the continuous wall 151. The second hole H2 is disposed corresponding to the first hole H1, that is, the first hole H1 and the second hole H2 have a common center point, and the inner diameter of the first hole H1 is larger than the inner diameter of the second hole H2.

The wire 160 passes through the accommodation space AS and one end thereof passes into the bearing space BS, and a portion of the wire 160 is engaged with the retaining wall 152. The wire 160 further includes a blocking portion 161, a positioning portion 162, and a recess 163, which are integrally connected and sleeved on the outer surface of the wire 160. The recess 163 is formed between the positioning portion 162 and the blocking portion 161, and the positioning portion 162 protrudes from the second hole H2 beyond the retaining wall 152. In particular, the outer diameter of the blocking portion 161 corresponds to the inner diameter of the first hole H1, the outer diameter of the positioning portion 162 corresponds to the inner diameter of the second hole H2, and the outer diameter of the recess 163 is smaller than the outer diameter of the positioning portion 162.

More specifically, the retaining wall 152 has a fixing block BL protruding from the retaining wall 152 and extended toward the center point of the second hole H2, and the fixing block BL is disposed corresponding to the positioning portion 162 of the wire 160. In particular, the positioning portion 162 has a positioning groove PG corresponding to the fixing block BL. The wire 160 can correspondingly pass through the connecting portion 150 only when the positioning groove PG of the positioning portion 162 is aligned with the fixing block BL.

In detail, the wire 160 is mounted, for example, from the first hole H1 on the outer surface OS of the side board 120, and sequentially passes through the positioning portion 162, the recess 163, and the blocking portion 161. The positioning groove PG of the positioning portion 162 is aligned with the fixing block BL and passes through the second hole H2, and the recess 163 also passes through the second hole H2 with the positioning portion 162. At the same time, the blocking portion 161 enters the accommodation space AS from the first hole H1 and is in contact with the continuous wall 151, and lastly the blocking portion 161 is closely adhered by the blocking of the retaining wall 152, and the accommodation space AS is completely filled by the blocking portion 161 to achieve the object of sealing the connecting portion 150.

Figure 2A:
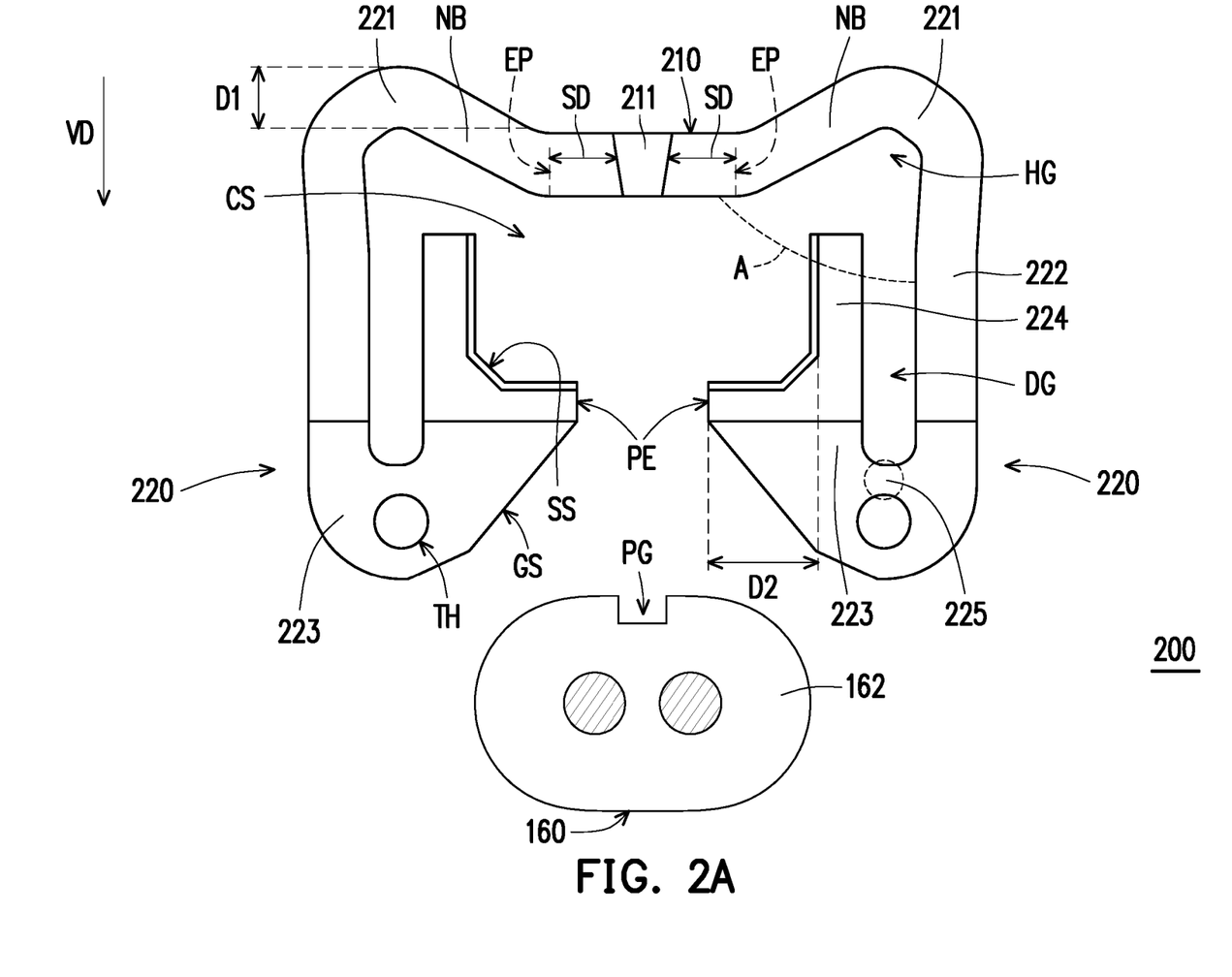
FIG. 2A is a schematic showing the separation state of a clamping ring and a wire according to an embodiment of the present invention.
Figure 2B:
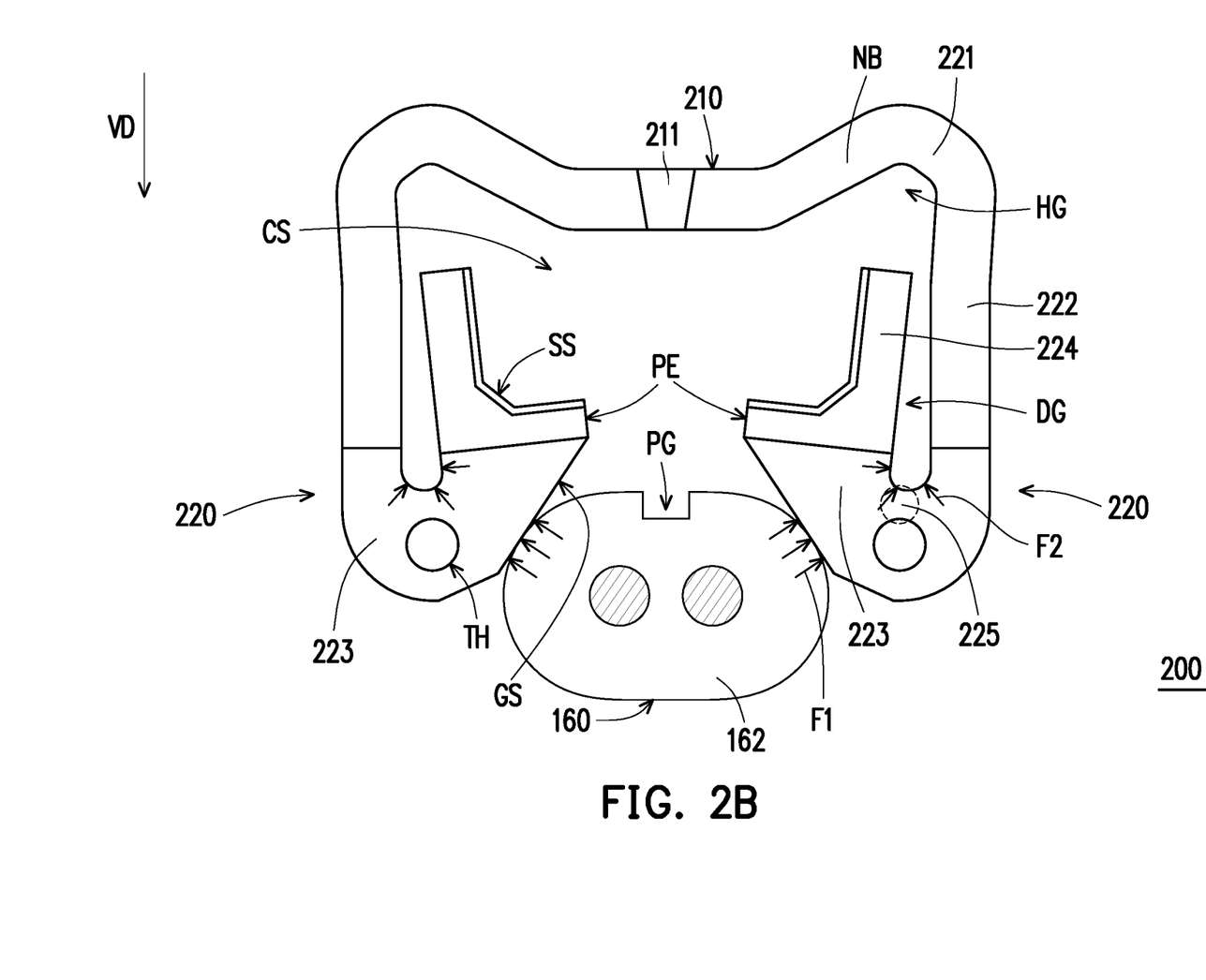
FIG. 2B to FIG. 2C are diagrams showing the assembly process of the clamping ring and the wire of FIG. 2A.
Figure 2C:
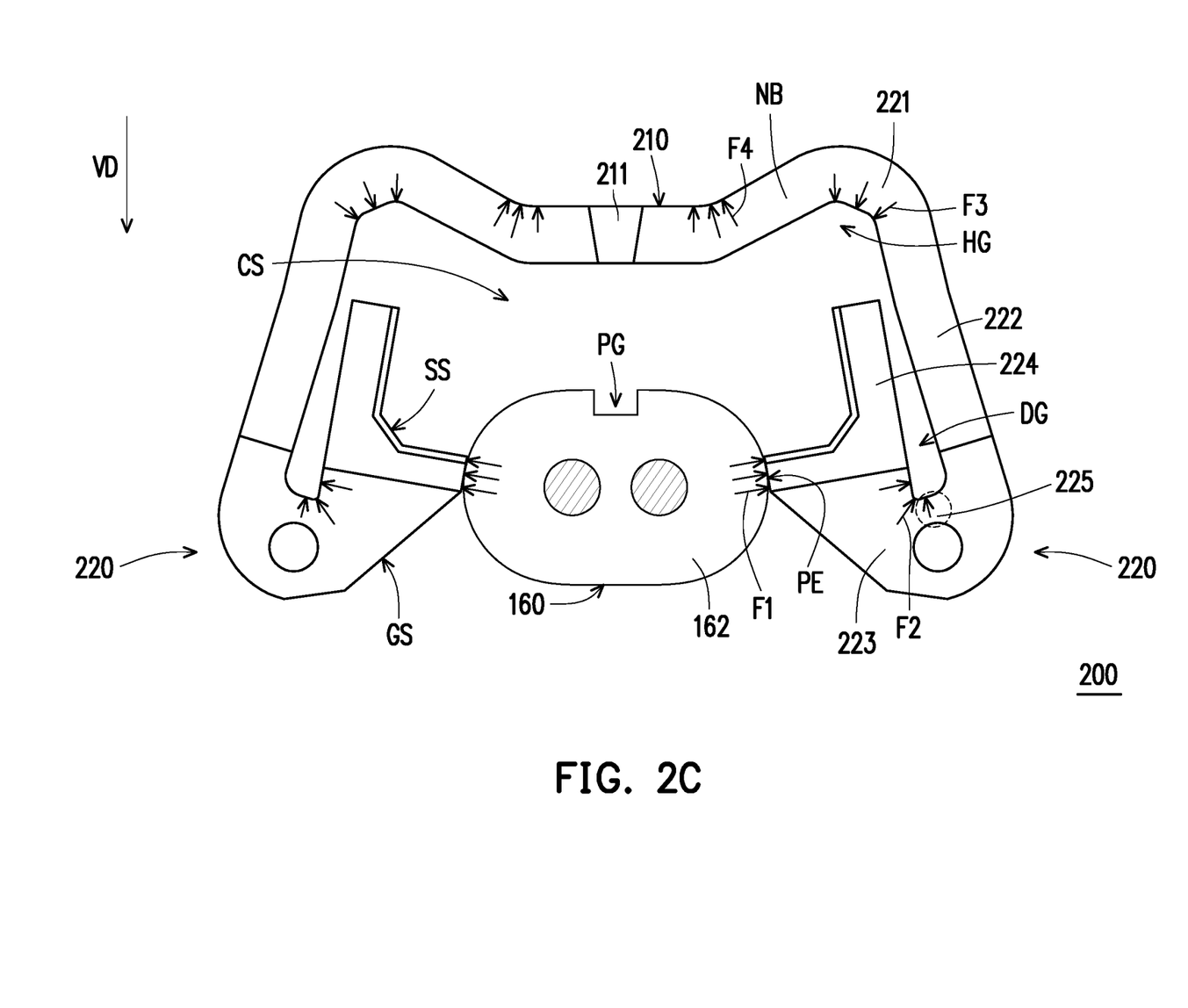
Figure 2D:
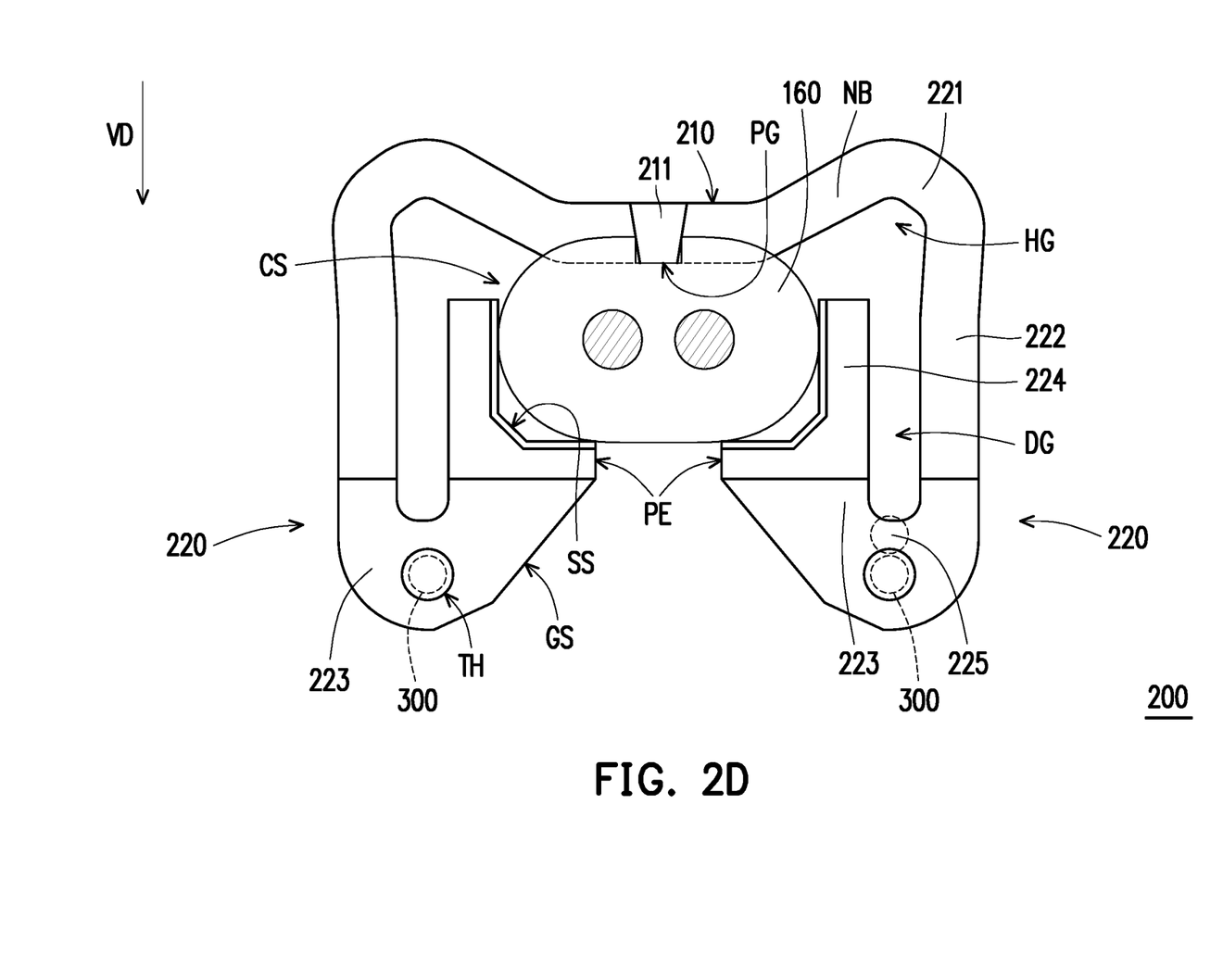
FIG. 2D is a schematic showing the holding state of the clamping ring and the wire of FIG. 2A.

FIG. 2A is a schematic showing the separation state of a clamping ring and a wire according to an embodiment of the present invention. FIG. 2B to FIG. 2C are diagrams showing the assembly process of the clamping ring and the wire of FIG. 2A. FIG. 2D is a schematic showing the holding state of the clamping ring and the wire of FIG. 2A.

Referring to FIGS. 2A and 2D and FIG. 1B to FIG. 1E, a clamping ring 200 clamps an end of the wire 160 adjacent to the second hole H2, the clamping ring 200 is located outside the accommodation space AS, and the outer diameter of the clamping ring 200 is larger than the aperture of the second hole H2. The clamping ring 200 includes a connecting beam 210 and two engaging members 220. The front side of the connecting beam 210 has a protrusion 211, and a spacing distance SD of the protrusion 211 with respect to two ends EP is the same. In particular, the protrusion 211 is used to engage with the positioning groove PG of the positioning portion 162 of the wire 160.

The two engaging members 220 are respectively disposed at the two ends EP of the connecting beam 210, and the connecting beam 210 and the two engaging members 220 are adapted to accommodate and position a wire. More specifically, the clamping ring 200 is disposed in the bearing space BS, and the connecting beam 210 and the two engaging members 220 of the clamping ring 200 are clamped on the recess 163 of the wire 160 to restrict the wire 160 to within the bearing space BS, which prevents the wire 160 from being detached from the connecting portion 150.

At least one of the two engaging members 220 of the clamping ring 200 (two engaging members 220 are shown in the figures) includes a curved portion 221, a column foot 222, a hook 223, a restricting column 224, and an abutting portion 225.

The curved portion 221 has an obliquely extended neck block NB, and the neck block NB is coupled to the corresponding end EP of the connecting beam 210. In detail, the neck block NB is extended toward an obliquely upward direction from the corresponding end EP such that the curved portion 221 has a vertical distance D1 with respect to the connecting beam 210. More specifically, the inside of the curved portion 221 forms a hollow groove HG, and the hollow groove HG is adapted to reduce the stress concentration of the curved portion 221 during deformation, thereby increasing the amount of elastic deformation of the curved portion 221. More specifically, the neck block NB can prevent the issue in which fracture occurs due to insufficient material thickness of the curved portion 221 from the hollow structure design on the inside of the curved portion 221.

The column foot 222 is coupled to the bottom of the curved portion 221 opposite to the neck block NB, and an angle A is formed between the column foot 222 and the connecting beam 210. In the present embodiment, the angle A between the column foot 222 and the connecting beam 210 is exemplified by 90 degrees. In other embodiments, the user can adjust the proper angle of the column foot and the connecting beam according to the shape and size of the wire to be clamped, and the angle range is, for example, greater than 0 degrees and less than 180 degrees, and the angle of the present invention is not restricted to 90 degrees.

The hook 223 is coupled to the inside of the column foot 222 and is located below the neck block NB. The restricting column 224 is coupled to the hook 223 and is extended toward the neck block NB of the curved portion 221. As a result, a deforming groove DG is formed between the restricting column 224 and the column foot 222. The deforming groove DG is adapted to move the restricting column 224 toward the column foot 222 when the hook 223 is deformed. The abutting portion 225 is coupled between the restricting column 224 and the column foot 222, and the abutting portion 225 is adapted to withstand and mitigate the stress generated by the deformation of the hook 223.

The hook 223 has a support surface SS and a guide surface GS. The support surface SS is disposed between the restricting column 224 and a restricting end PE of the hook 223, and the support surface SS is concave. Moreover, a portion of the support surface SS is, for example, parallel to the connecting beam 210, which facilitates the support of the wire 160 to be clamped. In detail, the connecting beam 210, the restricting column 224, and the support surface SS constitute a clamping space CS (see FIGS. 2A and 2B), and the clamping space CS is adapted to accommodate and clamp the wire 160.

The guide surface GS is disposed at a side of the hook 223 away from the column foot 222 and located below the restricting end PE. In particular, a horizontal distance D2 of the guide surface GS opposite to the restricting column 224 is gradually increased toward the direction of the connecting beam 210. Referring to FIG. 2A and FIG. 1C, the spacing between the two guide surfaces GS is tapered to guide the wire 160 to be clamped into the clamping space CS.

More specifically, each of the hooks 223 has a through hole TH disposed below the corresponding deforming groove DG, the through hole TH is adapted to be sleeved on an additional positioning column 300, and via the restricting effect of the through hole TH, the clamping ring 200 can be prevented from turning clockwise or counterclockwise.

Referring to FIG. 2A, the two engaging members 220 of the present embodiment may respectively include the curved portion 221, the column foot 222, the hook 223, the restricting column 224, and the abutting portion 225 above, and are symmetrically disposed to each other.

Referring to FIG. 2B and FIG. 1D, the clamping ring 200 of the present embodiment is adapted to be disposed in the shell structure 100 and to clamp and position the wire 160. The detailed assembly process is explained below. The user grabs the clamping ring 200 and moves toward the wire 160 along a vertical direction VD. When the guide surfaces GS of the two hooks 223 are abutted against and begins to guide the wire 160, each of the hooks 223 is subjected to the pushing of a first stress F1 of the wire 160 to be elastically deformed, and drives two of the restricting columns 224 toward two of the column feet 222 such that the deforming groove DG is compressed. Since each of the hooks 223 is elastically deformed, a second stress F2 from the pushing of the wire 160 is acted on the abutting portion 225.

Referring to FIG. 2C and FIG. 1D, after the wire 160 passes through two of the guide surfaces GS, the first stress F1 is acted on two of the restricting ends PE to push two of the hooks 223 and two of the column feet 222 relatively far apart. At this time, a third stress F3 generated by the pushing of the wire 160 is acted on the inside of each of the curved portions 221, and the two column feet 222 are driven outward away from the neck block NB by the hook 223, such that each of the curved portions 221 is elastically deformed to expand each of the hollow grooves HG. At the same time, a fourth stress F4 generated by the pushing of the wire 160 is acted on the joint of the connecting beam 210 and the two of the neck blocks NB, causing the neck blocks NB to expand outward with respect to the connecting beam 210.

Referring to FIG. 2D, after the wire 160 passes through the two restricting ends PE, the wire 160 enters the clamping space CS of the clamping g and the stresses (F1 to F4) acting on various parts of the clamping ring 200 are all canceled out due to the assembly of the wire 160. Thus, the curved portion 221, the column foot 222, and the hook 223 are all returned to the original position. At this time, the support surface SS of each of the hooks 223 carries the recess 163 of the wire 160, and the protrusion 211 of the connecting beam 210 is engaged with the positioning groove PG of the positioning portion 162. Lastly, the clamping ring 200 is clamped on the recess 163 and restricted by the protrusion 211 to prevent the wire 160 from coming loose or being separated from the connecting portion 150 of the shell structure 100 by external force pulling.

The specific effects of the clamping ring of the present invention are described below. First, the clamping space of the clamping ring of the present invention has a concave structure and conforms to the shape of the wire. Unlike the planar disposition of existing clamping rings, the situation in which stress is excessively concentrated when the clamping ring holds the wire due to the difference in shape can be avoided. Secondly, the clamping ring of the present invention has a hollow portion and an abutting portion, which can alleviate some of the stress concentrated between the connecting beam and the column foot during the assembly process of the conventional clamping ring and shift the stress to between the end of the connecting beam and the neck block and to the abutting portion so as to disperse the stress on the curved portion. As a result, the chance of fracture to the curved portion is reduced, thereby increasing the service life thereof. Thirdly, the clamping ring of the present invention has a diagonally extended neck block. As a result, the material thickness of the curved portion is not insufficient due to the hollow structure design on the inside of the curved portion of the present invention, and therefore fracture does not readily occur.

Based on the above, the clamping ring of the present invention is adapted to be disposed in the shell structure of an electronic adapter and to accommodate the wire positioned through the shell structure. The curved portion on at least one of the engaging members of the clamping ring forms a hollow groove. During the assembly process of the clamping ring, the clamping ring is deformed by the extrusion of the wire, and the curved portion can be elastically deformed by the hollow groove to reduce the stress acting on the curved portion. As a result, fracture of the curved portion due to excessive force can be alleviated to improve the yield of the assembled product. When the clamping ring is assembled, the clamping ring accommodates and clamps the wire, and the hollow groove of the curved portion can also reduce the build-up of the clamping stress to increase the service life of the clamping ring.

More specifically, a deforming groove is formed between the column foot and the hook, and during the assembly process of the clamping ring and the wire, the deforming groove causes the hook to be elastically deformed toward the column foot, which also reduces the stress acting on the engaging members and alleviates fracture damage, etc. In addition, via the dispositions of the hollow groove and the deforming groove, the material needed to make the clamping ring can be reduced.

Although the present invention has been described with reference to the above embodiments, it will be apparent to one of ordinary skill in the art that modifications to the described embodiments may be made without departing from the spirit of the present invention. Accordingly, the scope of the present invention is defined by the attached claims not by the above detailed descriptions.

What is claimed is:

1. A shell structure, comprising:
   a substrate;
   a side board disposed around an edge of the substrate, wherein the side board is extended upward along the edge of the substrate and has an inner surface;
   a connecting portion disposed on the side board, the connecting portion comprising:
   a first hole disposed at an outer surface of the side board;
   a continuous wall extended toward a direction of the inner surface along an edge of the first hole to form an accommodation space;
   a retaining wall disposed at an end of the continuous wall adjacent to the inner surface; and
   a second hole disposed at the retaining wall and disposed corresponding to the first hole, wherein the first hole is larger than the second hole;
   a wire passing through the accommodation space, wherein a portion of the wire is engaged with the retaining wall; and
   a clamping ring engaged with an end of the wire adjacent to the second hole, wherein the clamping ring is located outside the accommodation space and an outer diameter of the clamping ring is greater than an aperture of the second hole, the clamping ring comprising:
   a connecting beam;
   two engaging members respectively disposed at two ends of the connecting beam, wherein the connecting beam and the two engaging members are adapted to accommodate and position the wire,
   wherein at least one of the two engaging members comprises:
   a curved portion having an obliquely extended neck block, wherein the neck block is coupled to the corresponding end of the connecting beam such that the curved portion has a vertical distance with respect to the connecting beam, and an inside of the curved portion forms a hollow groove;
   a column foot coupled to a bottom of the curved portion opposite to the neck block, wherein an angle is formed between the column foot and the connecting beam; and
   a hook coupled to the column foot, wherein a deforming groove is formed between the column foot and the hook,
   wherein the hook has a guide surface disposed at a side of the hook away from the column foot, and a horizontal distance of the guide surface opposite to the restricting column is gradually increased toward the connecting beam.

2. The shell structure as claimed in claim 1, wherein the retaining wall has a fixing block protruding from the retaining wall, and the fixing block is disposed corresponding to the wire.

3. The shell structure as claimed in claim 1, wherein at least one of the two engaging members comprises a restricting column coupled to the hook and extended toward the curved portion to form the deforming groove.

4. The shell structure as claimed in claim 3, wherein at least one of the two engaging members comprises an abutting portion coupled between the restricting column and the column foot, and the abutting portion is adapted to withstand a stress resulting from a deformation of the hook.

5. The shell structure as claimed in claim 4, wherein the hook has a support surface disposed between the restricting column and a restricting end of the hook, and the support surface is concave.

6. The shell structure as claimed in claim 5, wherein the connecting beam, the restricting column, and the support surface form a clamping space, and the clamping space is adapted to accommodate and clamp the wire.

7. The shell structure as claimed in claim 1, wherein the other of the two engaging members comprises the curved portion, the column foot, and the hook, and are symmetrically arranged with each other.

8. The shell structure as claimed in claim 1, wherein a front side of the connecting beam has a protrusion, and a spacing distance of the protrusion with respect to the two ends is the same.

* * * * *